(12) United States Patent
Looker

(10) Patent No.: US 7,143,989 B2
(45) Date of Patent: Dec. 5, 2006

(54) AIRCRAFT CARGO AND SEATING PALLET

(75) Inventor: Robert Looker, Carpenteria, CA (US)

(73) Assignee: Satco, Inc., El Segundo, CA (US)

( * ) Notice: Subject to any disclaimer, the term of this patent is extended or adjusted under 35 U.S.C. 154(b) by 124 days.

(21) Appl. No.: 10/379,460

(22) Filed: Mar. 3, 2003

(65) Prior Publication Data
US 2004/0173723 A1    Sep. 9, 2004

(51) Int. Cl.
*A47B 91/00* (2006.01)
(52) U.S. Cl. .............................................. 248/346.02
(58) Field of Classification Search ........... 248/346.02, 248/346.03, 499; 410/104; 52/143, 79.1; 108/55.5, 57.32, 51.11; 414/12, 786; D34/38
See application file for complete search history.

(56) References Cited

U.S. PATENT DOCUMENTS

| | | | | |
|---|---|---|---|---|
| 3,396,678 A | * | 8/1968 | Jensen | 248/346.02 |
| 3,444,829 A | * | 5/1969 | Mork | 108/53.3 |
| 3,578,274 A | * | 5/1971 | Ginn et al. | 244/118.6 |
| 3,591,121 A | * | 7/1971 | Parris | 248/346.02 |
| 3,622,114 A | * | 11/1971 | McIntire | 248/346.02 |
| 5,101,964 A | * | 4/1992 | Westphal | 198/867.14 |
| 5,383,630 A | * | 1/1995 | Flatten | 244/118.6 |
| 5,586,666 A | * | 12/1996 | Squitieri | 211/175 |
| 5,870,958 A | * | 2/1999 | Suzuki | 108/54.1 |
| 6,302,358 B1 | * | 10/2001 | Emsters et al. | 244/137.1 |
| 6,701,852 B1 | * | 3/2004 | Sedge | 108/54.1 |

* cited by examiner

*Primary Examiner*—Gwendolyn Baxter
(74) *Attorney, Agent, or Firm*—Perkins Coie LLP

(57) ABSTRACT

An aircraft cargo and seating pallet having one or more internal stringer sections including a top section configured to engage a seat and/or a seat attachment. The top section may be a linear track along which the seat or seat attachment may slide, or it may include fixed attachment points for securing the seat to the pallet. The aircraft cargo and seating pallet may also include one or more hinged flaps that are positionable over flanges extending outwardly from a lower portion of the pallet. As a result, the flanges are not exposed to passengers, and the open space between adjacent pallets is substantially minimized.

10 Claims, 6 Drawing Sheets

AIRCRAFT CARGO AND SEATING PALLET

BACKGROUND OF THE INVENTION

Air cargo pallets are commonly used to support and secure cargo during transportation via aircraft. In many applications, particularly military applications, passenger seats for transporting passengers may be mounted on the pallets. These types of seating pallets allow cargo aircraft, which have few or no permanent passenger seats, to be rapidly equipped with large numbers of passenger seats.

Existing air cargo pallets typically include top and bottom aluminum sheets attached to a core. Traditional air cargo pallets typically included a balsa core, while modern pallets have been developed that include a core of aluminum stringers running lengthwise between the top and bottom aluminum sheets. Lateral struts are typically positioned perpendicularly to the stringers to strengthen the pallet. Examples of air cargo pallets having a core of aluminum stringers and lateral struts are described in U.S. Pat. No. 4,690,360, incorporated herein by reference.

Air cargo pallets used for passenger seating typically include linear seat tracks attached to the top metal sheet of the pallets. Seats are connected to the linear tracks via fittings on the seats or via separate attachments. The seats and/or the seat attachments typically include one or more locking devices to temporarily lock the seat into place on the linear tracks, such that the seat may be shifted forward or backward along the tracks when the locking device is disengaged, and then locked into place by engaging the locking device.

While this seating system has worked relatively well, the linear tracks occasionally become loosened from the pallet over time, due to the heavy loads applied to the tracks, particularly when the aircraft encounters heavy turbulence or other rough flying or landing conditions. In these cases, the tracks often have to be replaced, which can be time-consuming and expensive. There is also the possibility that the tracks could break free from the pallet under extreme load conditions, such as during an emergency landing or crash. Thus, there is a need for an aircraft cargo and seating pallet having improved strength and durability.

Air cargo pallets are typically secured to the cargo bay of an aircraft with a securing mechanism located in the cargo bay. The securing mechanism is a permanent assembly or subsystem of the aircraft, while the pallets can be installed into and removed from the aircraft, as needed. The pallets are typically "notched," or include spaced apart flanges that extend outwardly from a lower portion of the pallet core. The securing mechanism engages these flanges and secures the pallet to the cargo bay.

While only two opposite sides of the pallet are generally secured in the cargo bay, existing air cargo pallets typically include flanges on all four sides of the pallet. As a result, the flanges, which are generally approximately two inches in length, protrude from the pallet on all sides. Air cargo pallets are generally positioned in a cargo bay with the flanges on one pallet located very close to the flanges on neighboring pallets, to maximize the available space in the cargo bay.

This pallet spacing configuration often leads to problems, as passengers may drop items between neighboring pallets and have a difficult time retrieving the items, due to the small opening (approximately four inches) between the pallets and the flanges located in the opening. Moreover, passengers may inadvertently step into the opening, causing them to fall or be injured.

SUMMARY OF THE INVENTION

The invention is directed to an aircraft cargo and seating pallet having longitudinal stringers that include a top section configured to receive a seat fitting and/or a seat attachment. The attachment point is part of the stringer itself. The seat is therefore better secured to the pallet as compared to existing seat tracks that are separately attached to the top metal sheet of the air cargo pallet. The invention is also directed to an aircraft cargo and seating pallet having one or more hinged flaps or platforms that are positionable over the flanges protruding outwardly from the pallet. When the flaps are positioned over the flanges, the flanges cover the open space between adjacent pallets. This provides a much more uniform and continuous floor surface for passengers to walk on.

In a first aspect, an air cargo pallet includes a platform or flap hinged to an upper portion of a core section, with the platform pivotable between a first or undeployed position where the flap is located above the core section, to a second or deployed position where the flap is generally co-planer with the top surface of the pallet and extends outwardly from a side of the pallet.

In a second aspect, the pallet has a lower flange which extends laterally outwardly from the pallet beyond the flap.

In a third aspect, the core section of the air cargo pallet includes at least one stringer having a top section adapted to receive a seat attachment.

In a fourth aspect, the core section of the air cargo pallet includes at least one stringer having a first sheet attachment section extending laterally from a first side of the top section of the stringer, and a second sheet attachment section extending laterally from a second side of the top section of the stringer. First and second portions of a top sheet of the pallet are attached to the first and second attachment sections, respectively.

In a fifth aspect, a seat attachment is slidable in a track attached to a top section of a stringer on the pallet. The track may include openings which may be engaged by a locking device on the seat attachment, to lock and hold the seat in place on the track.

In a sixth aspect, the core section of the air cargo pallet includes a stringer having a top section adapted to directly receive and secure a seat attachment to the top section.

In a seventh aspect, the core section of the air cargo pallet includes a stringer having a top section that is flush with the top sheet of the pallet.

In an eighth aspect, the core section of the air cargo pallet includes at least one stringer having a top section that separates adjacent portions of the top sheet of the pallet. A seat is attached to the top section of the stringer.

Other features and advantages of the invention will appear hereinafter. The invention resides as well in sub-combinations of the features described.

DETAILED DESCRIPTION OF THE DRAWINGS

Figure 1:
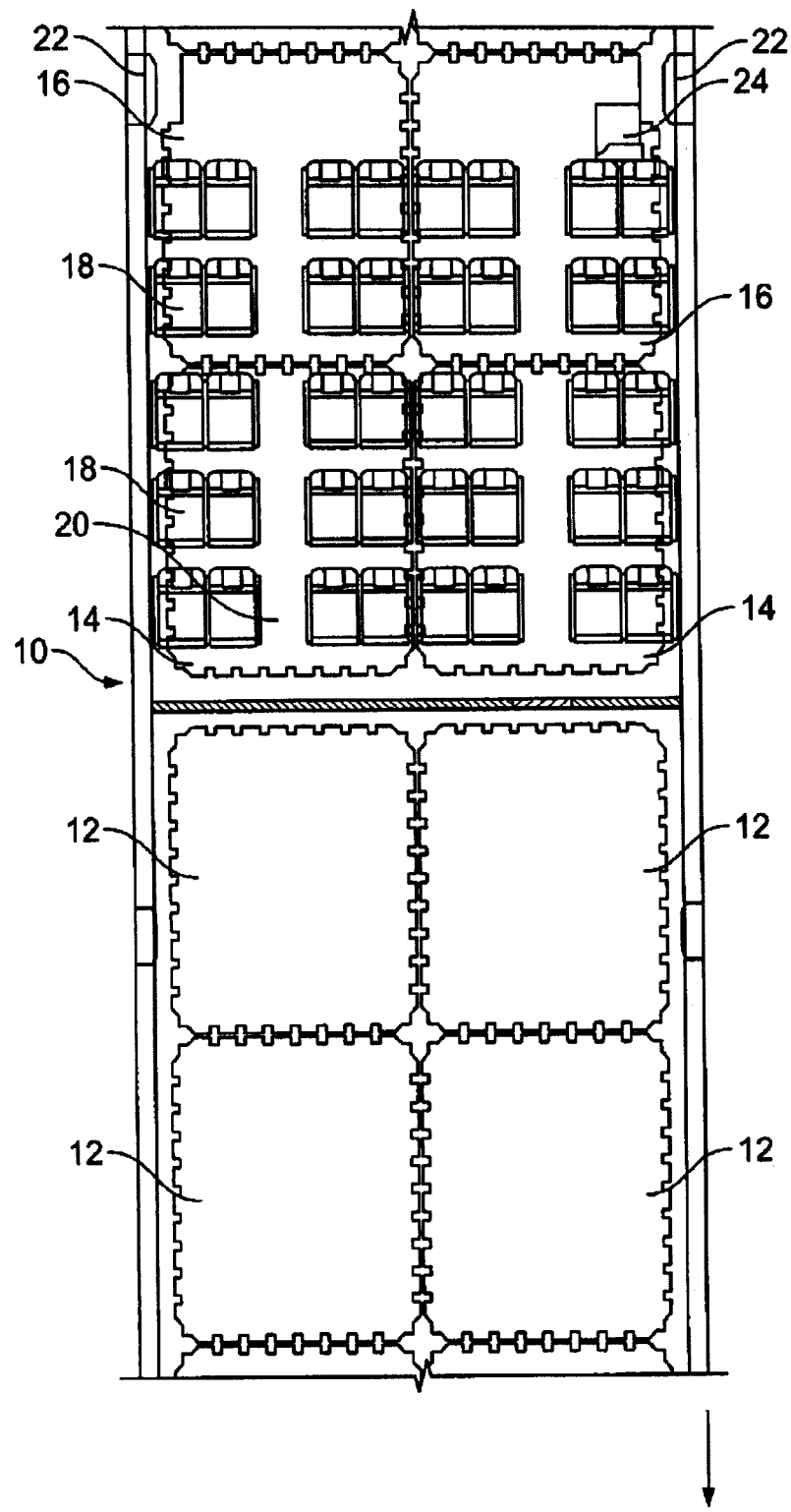
FIG. 1 is a plan or top interior view of an aircraft having aircraft cargo and seating pallets secured therein.

Preferred embodiments will now be described with reference to the drawings. For ease of description, any reference character identifying an element in one figure will represent the same element in any other figure.

FIG. 1 is an interior top or plan view of an aircraft fuselage 10. Conventional air cargo pallets 12, as well as air seating pallets 14, 16, are shown in the fuselage 10. A plurality of passenger seats 18 are secured to the upper surface of the seating pallets 14, 16. The front seating pallets 14 each have three rows of four seats 18, with two of the seats 18 in each row separated from the other two seats 18 by an aisle 20. The rear seating pallets 16 each have two rows of four seats 18, due to the location of exit doors 22, which require that the seating pallets 16 have an alternate configuration. One or more attendant seats 24 may optionally be included on one or more of the seating pallets 14, 16. An alternative number of seats 18 on each pallet, as well as the general seating and pallet arrangement, may of course vary from that which is shown in FIG. 1 which shows representative examples.

Figure 2:
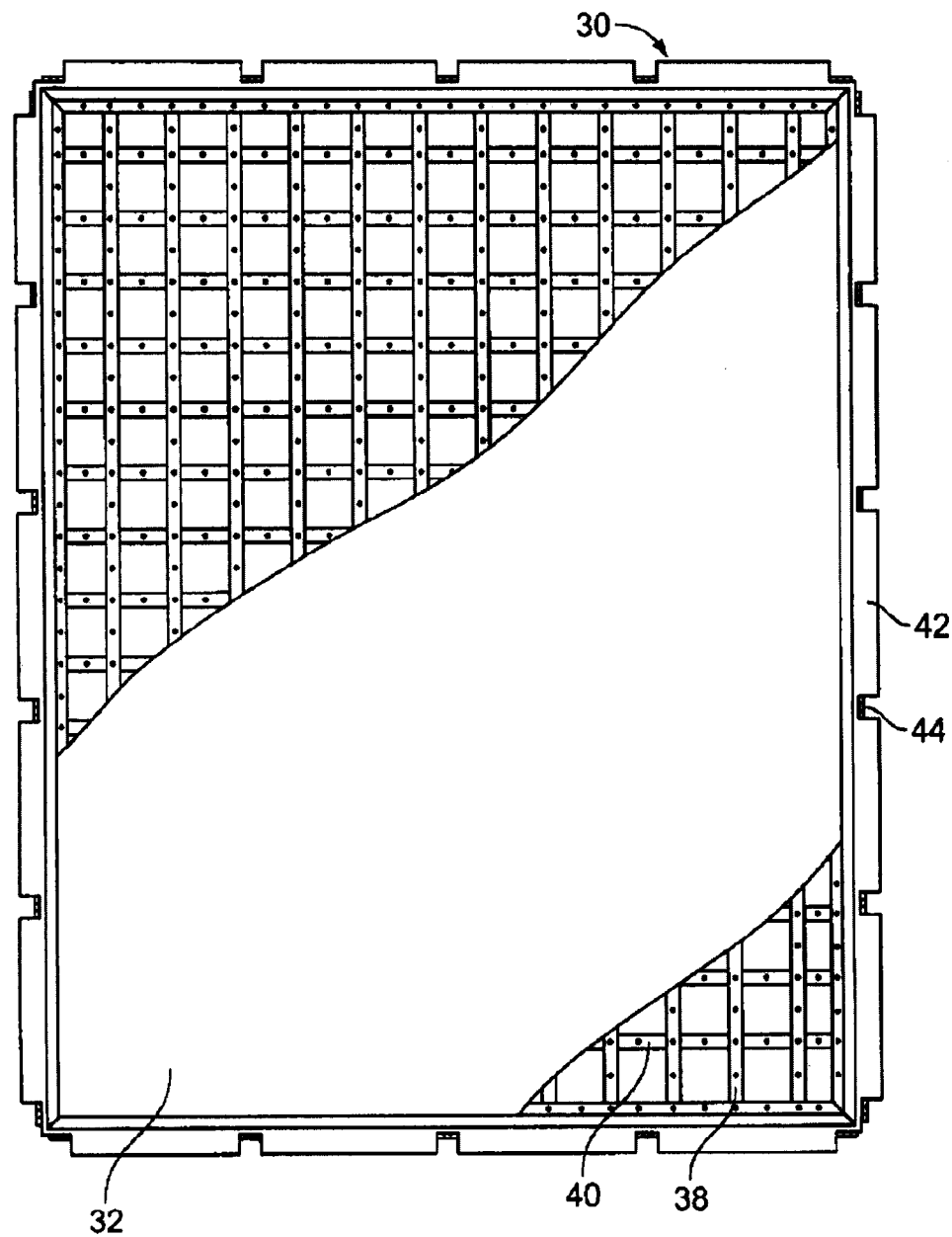
FIG. 2 is a plan view of a prior art air cargo pallet.
Figure 3:
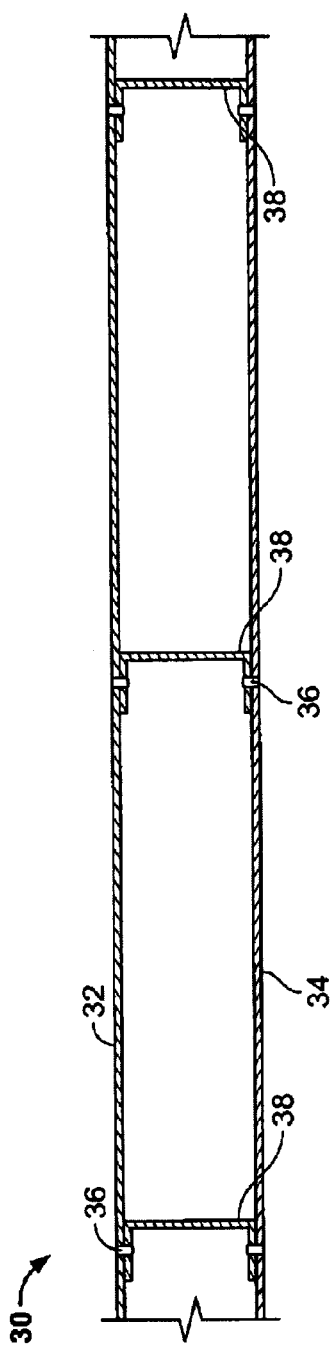
FIG. 3 is a partial section view of the prior art air cargo pallet shown in FIG. 2.

FIGS. 2 and 3 show an air cargo pallet 30 as described in U.S. Pat. No. 4,690,360, which is herein incorporated by reference. The air cargo pallet 30 includes a plurality of longitudinally arranged C-shaped stringers 38, or C-channel bars, attached to a top sheet 32 and a bottom sheet 34 preferably via rivets 36. Edge extrusions or structures 52 form the perimeter or sides of the pallet. The outer edges of the top and bottom sheets 32 and 34 are attached to upper and lower lips or surfaces 55 and 57 of the edge extrusions 52. The ends of each of the stringers are preferably also joined to the edge extrusions 52.

While only three stringers 38 are shown in the partial view illustrated in FIG. 3, a typical pallet of course has stringers spaced approximately 10 inches from one another along the entire width of the pallet 30. Generally, air cargo pallets are approximately 88 inches wide by 108 inches long. Accordingly, 9 to 11 longitudinal stringers are typically used in existing pallets (depending on whether stringers are employed at the outer edges of the pallets). Struts 40, located perpendicularly to the stringers 38, are preferably used to further strengthen the pallet and to support the top sheet 32 and the bottom sheet 34, as described in U.S. Pat. No. 4,690,360.

The edge extrusions 52 have flanges 42 extending outwardly on all four sides of the pallet 30. The flanges 42 are separated from one another by notches 44, which allow a securing or locking mechanism in an aircraft to engage the flanges 42 and secure the pallet to the aircraft interior.

Each flange 42 extends outwardly approximately 1 to 3 inches, preferably 2 inches, from the pallet 30. To efficiently use the space in an aircraft, the air cargo pallets 30 are typically positioned with the flanges 42 on one pallet very close to, or in contact with, the flanges 42 on neighboring pallets. Thus, there is typically a space or gap between the top sheets 32 or top surfaces of adjacent pallets of approximately 2 to 6 inches, preferably 4 inches.

This space or gap between adjacent pallets can make walking (or rolling equipment, luggage, etc.) difficult. Items, such as pens or eating utensils, may be accidentally dropped into the gaps where retrieval can be difficult.

Figure 4:
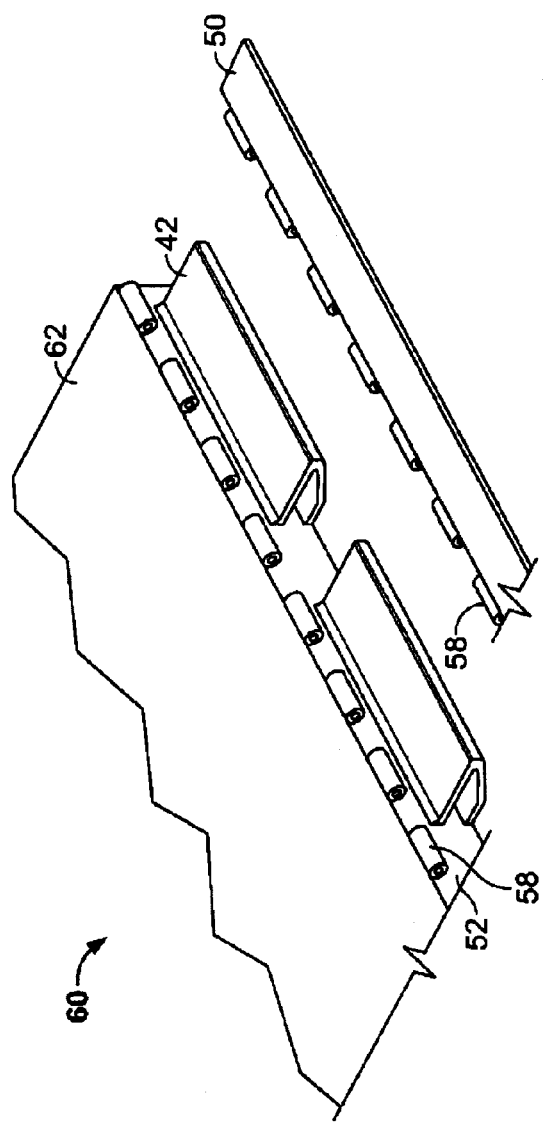
FIG. 4 is a partial perspective view of the present air cargo pallet having a hinged flap.
Figure 5A:
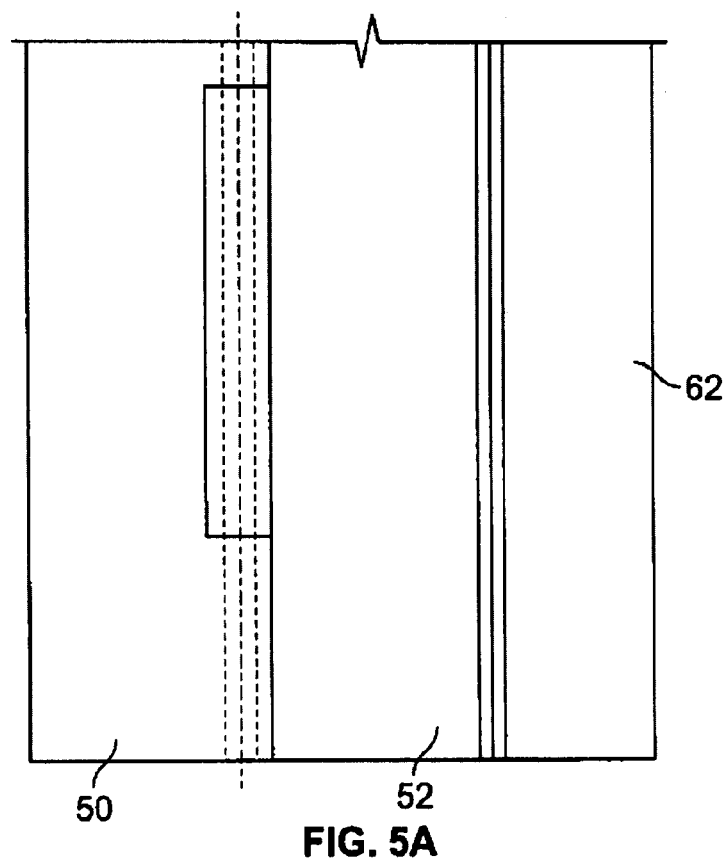
FIG. 5A is a plan view of a hinged flap on an air cargo pallet in a down position.
Figure 5B:
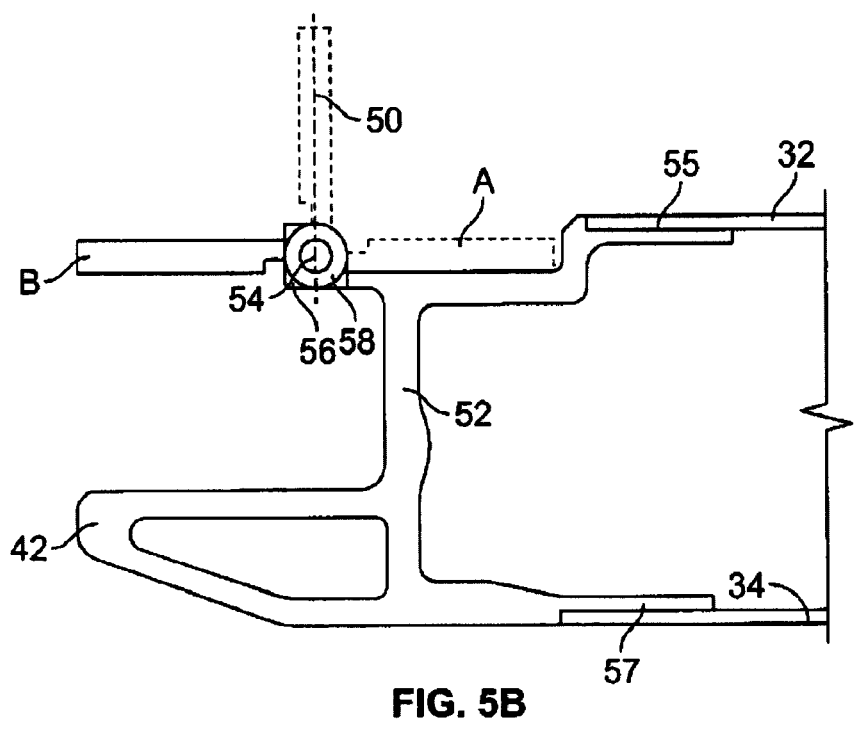
FIG. 5B is a side view of the flap on the air cargo pallet shown in FIG. 5A, in three alternative positions.

FIGS. 4, 5A, and 5B show an air cargo and seating pallet 60 having a hinged platform or flap 50 extending from an upper surface of the pallet. The pallet 60 and flap 50 are preferably made of metal, such as aluminum, steel, or another suitable material. The flap 50 is pivotable via hinge members 58, from a first position A, where the flap 50 is located above and/or lying on the edge extrusion 52, to a second position B, where the flap 50 is deployed and located above the flange 42 of the edge structure 52. The flap 50 preferably has a friction fit with a rod 54 about which the flap 50 pivots, to hold the flap 50 into place. A spring or other suitable device may also be employed to hold the flap 50 into place, in position B.

The flap 50 is preferably prevented from pivoting beyond position B by a stop 56 on the flap 50 that contacts the edge structure or extrusion 52 when the flap 50 reaches position B, or by another suitable structure. Thus, when in position B, the flap 50 lies in substantially the same horizontal plane as the upper surface 62 of the pallet 60, and is approximately co-planer or level with the top sheet 32. In this way, the flap 50 forms an extension of the upper pallet surface 62. In position B, the flap 50 extends outwardly from the pallet approximately the same distance (approximately 1 to 3 inches), and preferably a slightly shorter distance (e.g., ⅟₃₂–¼ or ⅟₁₆–⅛ inch), than the flange 42. Accordingly, when two pallets having flaps 50 on facing or adjacent sides are located next to one another, the edges of the flaps 50, when in position B, are close to, but not in contact with, each other.

The flap 50 may be pivoted manually between positions A and B, or may be pivoted by a mechanism in the aircraft. When a flap 50 is in position B, the flanges 42 below the flap are substantially covered, and the gap between pallets is almost completely covered over.

A flap 50 may be located on each of one, two, three, or four sides of the pallet 60. Flaps 50 are preferably located on all four sides of the pallet 60 so that, regardless of where the pallet 60 is positioned in an aircraft, flaps 50 may be used to form extensions on any side of the pallet 60 where people are likely to walk. Additionally, having flaps 50 on all four sides of the pallet 60 allows the pallet 60 to be positioned on any side of neighboring pallets in the aircraft, while still allowing the flaps 50 to cover any of the gaps between the neighboring pallets. The flap design shown in FIG. 5B can of course also be used on a pallet having no seats or seat features.

In use, pallets 60 are loaded into an aircraft with a forklift, a hydraulic lift, and/or a conveyor mechanism, or are already located in the aircraft. The pallets 60 are then positioned in their desired locations and secured to the aircraft with a securing or locking mechanism in the cargo bay, or other location within the aircraft. The securing mechanism engages the flanges 42 on the side of the pallet 60 facing the aircraft wall and/or centerline, thus locking the pallet 60 into place. In a preferred embodiment, the securing mechanism includes a locking mechanism that moves into the notches between the flanges 42, and a lip that engages the top of the flanges 42. After the pallet is secured, one or more flaps 50 on the pallet 50 may be pivoted from position A to position B by hand, or by a mechanism in the aircraft. Once the flaps 50 are pivoted into place, passengers may board the aircraft and have an improved floor surface to walk on.

Figure 6:
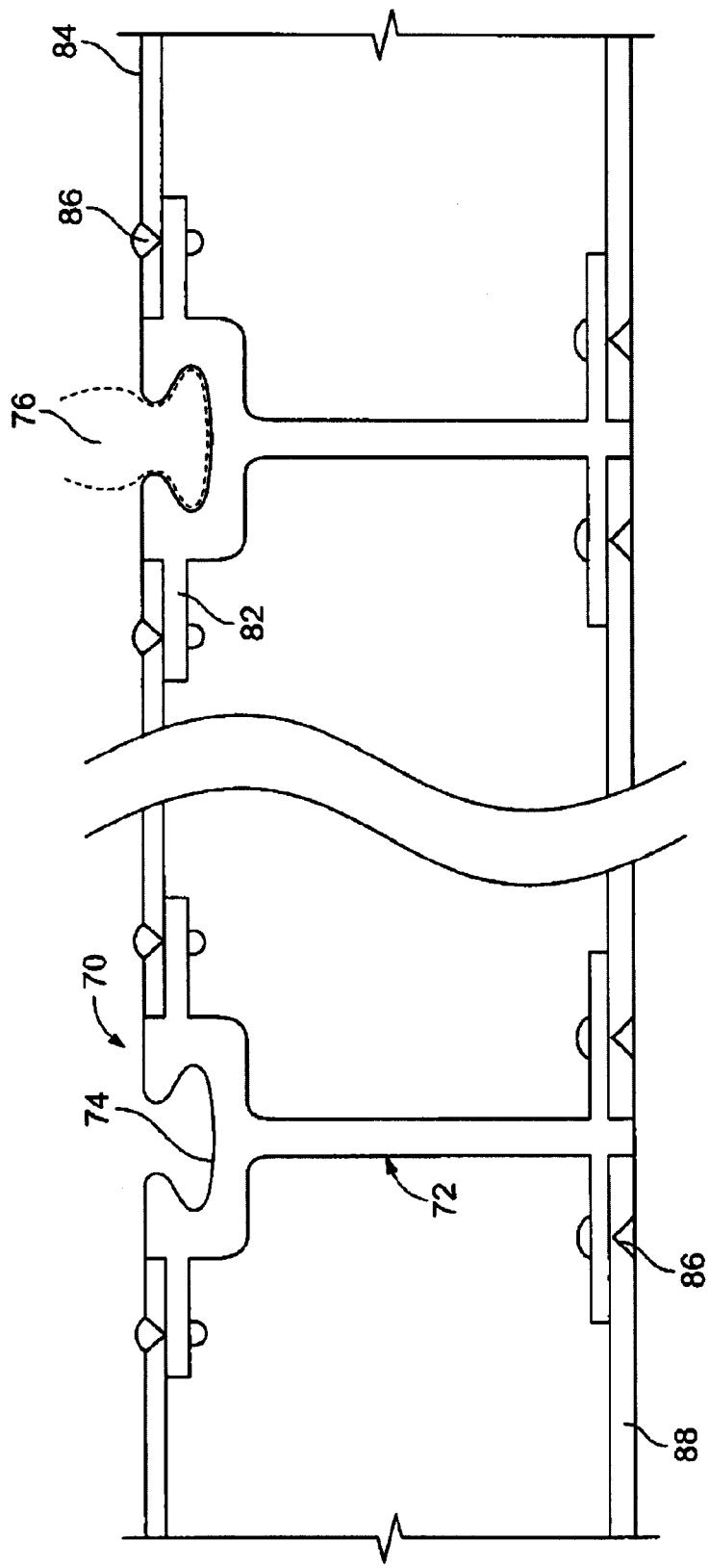
FIG. 6 is a partial section view of an alternative air cargo pallet embodiment having stringers with seat tracks in the stringers.

FIG. 6 shows a partial section or end view of an air cargo and seating pallet 70 having modified stringers 72 with a seat track 74 in an upper portion of each modified stringer 72. The seat track 74 is adapted to receive a seat attachment 76 (shown in phantom in FIG. 6) or other fitting on a seat. Accordingly, a separate seat track, as used in existing seating pallets, is not required. By using a stringer 72 with a top section that includes a seat track 74, the seat track 74 is stronger than if it were a separate component attached to the top sheet of the pallet 70. In addition, fewer components are needed.

Each seat, or each set of connected seats, is preferably slidably attached to the tracks 74 of two modified stringers 72. In a preferred embodiment, four modified stringers 72 are provided in a single pallet 70. For example, if the configuration of seats shown in FIG. 1 is used, two modified stringers 72 would be located under the outer portions of each of the two sets of connected seats in a row, such that four total modified stringers 72 are used in the pallet.

Conventional C-shaped stringers, such as those shown in FIG. 3 and described in U.S. Pat. No. 4,690,360, are preferably used at the other stringer locations. Thus, the two modified stringers 72 used for a given set of seats typically have one or more conventional C-shaped stringers positioned between them. The modified and conventional stringers are both preferably made from a strong, lightweight metal, such as aluminum extrusions. All of the stringers preferably run substantially the entire length of the pallet 70 and are attached to the edge structure or extrusion 52, to provide adequate structural support.

Figure 7:
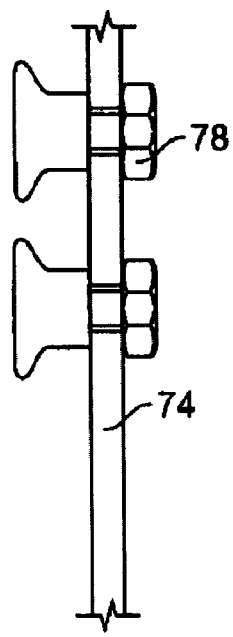
FIG. 7 is a partial side view of an attachment device on a seat track used to secure a seat to the seat track.
Figure 8:
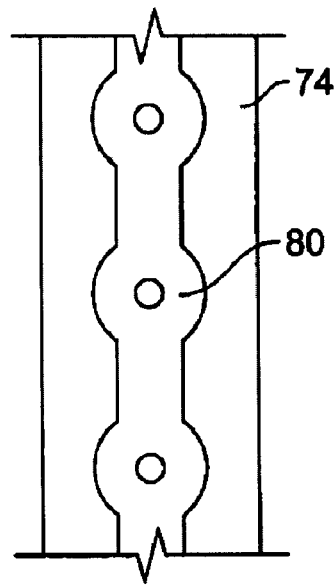
FIG. 8 is a partial top plan view of a seat track on or in a stringer.

The seats may be directly attached to the tracks 74, or a separate attachment device may be used to connect the seat to the track 74. FIG. 7 shows a pair of locking mechanisms 78 that are used to secure a seat, or an attachment device on a seat, to a track 74. As shown in FIG. 8, locking stations 80 are preferably sequentially spaced along the track 74, which allow the seat or attachment device to be locked at a variety of positions via the locking mechanisms 78.

Seats used on air seating pallets typically include one or more spring-loaded plungers or similar structures that engage the locking mechanisms 78. To change the seat position on the pallet, the plunger(s) are lifted to disengage the locking mechanisms 78 from the locking stations 80. This allows shifting of the seat forward and backward along a pair of tracks 74. The user then releases the plunger(s) so that the locking mechanisms 78 engage the locking stations 80 at a desired seating position. The seat is then locked in place.

As shown in FIG. 6, the modified stringers 72 each preferably include two upper attachment sections or arms 82 extending laterally from opposite sides of the track section 74. Top sheet sections 84 of the pallet 70 are preferably attached to the attachment sections 82 with rivets 86 or other suitable attachment means. The top of the track section 74 may be flush with the upper surface of the top sheet sections 84, as illustrated in FIG. 6, or may be slightly above or below the upper surface of the top sheet sections 84. The lower pallet sheet may also be in sections 88, as shown in FIG. 6, or may be a single sheet. In the case where a single bottom sheet is used, the bottom of the stringers 72 shown in FIG. 6 is modified to be flat, similar to the bottoms of the C-shaped stringers shown in FIG. 3.

The top sheet sections 84 and the bottom sheet, or bottom sheet sections 88, are preferably attached to every stringer with which they make contact. The sheets are preferably made of metal, such as aluminum, and are attached to the stringers with rivets 86 or other suitable attachment means. The top and bottom sheets are preferably very thin, thereby keeping the cost and weight of the sheets to a minimum. The top sheet sections may have a thickness of 0.06 to 0.18 inches, preferably 0.10 to 0.14 inches, and the bottom sheet, or bottom sheet sections, may have a thickness of 0.09 to 0.20 inches thick, preferably 0.13 to 0.17 inches.

Figure 9:
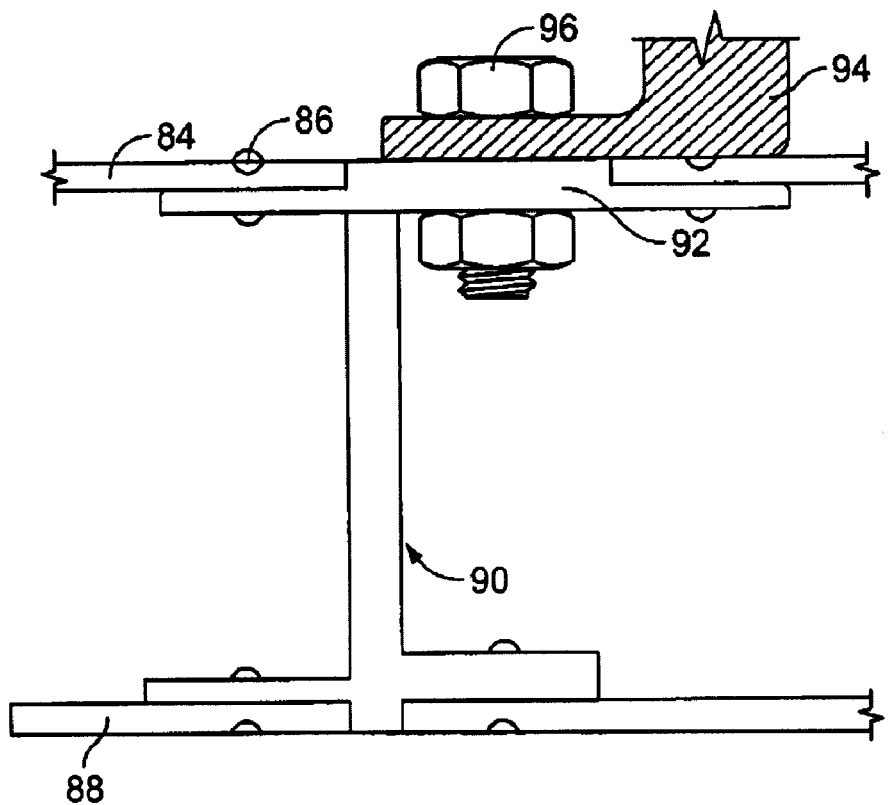
FIG. 9 is a partial section view of a seat attachment secured to a stringer on a pallet with an attachment device.

FIG. 9 shows an alternative embodiment of a modified stringer 90 having a thicker upper section 92 that does not include a track. A seat attachment 94, or other seat fitting, may be directly secured to the upper section 92 with a rivet-nut 96, or other suitable attachment device. In this embodiment, the seat can not be moved forward and backward, as the seat is directly secured to the stringer 90, and is not supported on a track. The attachment portion 92 of the stringer 90 is preferably thicker than the other sections of the stringer 90, to provide added strength at the point of attachment. Traditional C-shaped stringers are again preferably employed in the stringer locations where seats are not attached.

Generally, so long as the modified stringers described herein are positioned where seats may properly be attached, the remaining stringers may be spaced as desired. Thus, while it is preferred to have the stringers equally spaced from one another to provide more uniform structural support to the pallet, other spacing configurations may be used.

The preferred dimensions of the air cargo and seating pallet and the stringers may vary depending on the requirements of a given application. Thus, the invention relates to pallets of any size having any of the features described herein. Moreover, the features of the air seating pallet 60 shown in FIGS. 4 and 5 may be combined with the features of the seating pallet 70 shown in FIGS. 6–8 and/or FIG. 9 or they may each be used separately. Thus, a seating pallet may include both pivoting flaps and stringers having seating tracks, or stringers adapted to be directly secured to seat attachments or fittings.

While embodiments and applications of the present invention have been shown and described, it will be apparent to one skilled in the art that other modifications are possible without departing from the inventive concepts herein. The invention, therefore, is not to be restricted except by the following claims and their equivalents.

What is claimed is:

1. An air cargo pallet, comprising:
   a top sheet;
   a bottom sheet spaced apart from and substantially parallel to the top sheet;
   an edge structure between and attached to the top sheet and the bottom sheet;
   a flange extending outwardly from a lower portion of the edge structure; and
   a flap pivotably connected directly to an upper portion of the edge structure, with the flap pivotable between a first position where the flap is above at least part of the edge structure, and a second position where the flap is located above the flange.

2. The air cargo pallet of claim 1 wherein the flange is configured for engagement with a securing mechanism in an aircraft.

3. The air cargo pallet of claim 1 wherein the flange includes a lower angled surface to facilitate sliding of the pallet over uneven surfaces.

4. The air cargo pallet of claim 1 wherein the flange extends beyond the flap when the flap is in the second position.

5. An air cargo pallet, comprising:

a top sheet;

a bottom sheet spaced apart from and substantially parallel to the top sheet;

an edge structure between and attached to the top sheet and the bottom sheet at each of the four sides of the top and bottom sheets;

a flange extending outwardly from a lower portion of each of the edge structures; and a flap pivotably connected directly to an upper portion of each of the edge structures, wherein each of the flaps is pivotable between a first position where the flap is located above the edge structure, and a second position where the flap is located above the flange.

6. The air cargo pallet of claim 5 wherein the edge structure comprises a hollow extrusion.

7. An air cargo pallet, comprising:

a top sheet;

a bottom sheet spaced apart from and substantially parallel to the top sheet;

a plurality of stringers extending across the pallet between the top and bottom sheets;

an edge structure between and attached to the top sheet and the bottom sheet;

a flange extending outwardly from a lower portion of the edge structure; and a flap pivotably connected directly to an upper portion of the edge structure, with the flap pivotable between a first position where flap adjacent the top sheet, and a second position where the flap is located above the flange.

8. The air cargo pallet of claim 7 wherein at least one of the stringers includes a top section adapted to receive a seat attachment.

9. An air cargo pallet, comprising:

a top sheet;

a bottom sheet spaced apart from and substantially parallel to the top sheet;

an edge structure between and attached to the top sheet and the bottom sheet;

a flange extending outwardly from a lower portion of the edge structure;

a flap pivotably connected directly to an upper portion of the edge structure, with the flap pivotable between a first position where the flap overlies at least part of the edge structure, and a second position where the flap is located above the flange; and a spring biasing the flap into the first or second position.

10. An air cargo pallet, comprising:

a first top sheet section;

a second top sheet section;

a bottom sheet spaced apart from and substantially parallel to the top sheet sections;

a plurality of stringers attached to and running lengthwise between the top and bottom sheets, wherein at least one of the stringers includes a top section adapted to directly receive a seat attachment, with the top section including a first sheet attachment section extending laterally from a first side of the top section, and a second sheet attachment section extending laterally from a second side of the top section; and said first and second top sheet sections attached to the first and second attachment sections, respectively, wherein an upper surface of each of the first and second top sheet sections is substantially flush with an upper surface of the top stringer section.

* * * * *